(12) United States Patent
Behnke et al.

(10) Patent No.: US 7,489,130 B2
(45) Date of Patent: Feb. 10, 2009

(54) METAL DETECTION DEVICE

(75) Inventors: Willi Behnke, Steinhagen (DE); Markus Brune, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 147 days.

(21) Appl. No.: 11/326,053

(22) Filed: Jan. 5, 2006

(65) Prior Publication Data

US 2006/0174600 A1 Aug. 10, 2006

(30) Foreign Application Priority Data

Feb. 7, 2005 (DE) ........................ 10 2005 005 736

(51) Int. Cl.
*G01N 27/72* (2006.01)
(52) U.S. Cl. ............................. 324/239; 56/131; 56/153
(58) Field of Classification Search ................. 324/239; 56/131, 531, 153
See application file for complete search history.

(56) References Cited

U.S. PATENT DOCUMENTS

| | | | | |
|---|---|---|---|---|
| 3,065,412 A | * | 11/1962 | Rosenthal | .................... 324/239 |
| 3,757,501 A | * | 9/1973 | Bennett et al. | .................. 460/2 |
| 4,591,834 A | * | 5/1986 | Kyle | ............................ 340/566 |
| 4,853,617 A | * | 8/1989 | Douglas et al. | ................ 324/67 |
| 5,504,428 A | * | 4/1996 | Johnson | ....................... 324/243 |
| 5,512,823 A | * | 4/1996 | Nepveu | ....................... 324/258 |
| 5,648,659 A | * | 7/1997 | Bourguignon et al. | . 250/363.04 |
| 6,315,658 B1 | * | 11/2001 | Weber | ............................ 460/6 |
| 6,381,932 B1 | * | 5/2002 | Clauss | ....................... 56/10.2 J |
| 7,064,540 B2 | * | 6/2006 | Brune et al. | ................. 324/232 |
| 2004/0093841 A1 | * | 5/2004 | Clauss | ...................... 56/16.4 R |
| 2005/0044837 A1 | * | 3/2005 | O'Toole et al. | ................ 56/153 |

FOREIGN PATENT DOCUMENTS

EP 0 702 248 12/2001

* cited by examiner

*Primary Examiner*—Reena Aurora
*Assistant Examiner*—Michael A Strieb
(74) *Attorney, Agent, or Firm*—Michael J. Striker

(57) ABSTRACT

A metal detection device for a working unit with at least one driven working element for conveying crop material has windings for generating electrical detection signals when metal objects are present in the region of the working unit, and the detection signals generated by the windings are detected in a time window, thereby enabling a more accurate identification of the metal object.

23 Claims, 3 Drawing Sheets

METAL DETECTION DEVICE

BACKGROUND OF THE INVENTION

The present invention relates to a metal detection device.

A metal detector on a forage harvester for detection of metallic foreign objects in crop material is disclosed in EP 0 702 248. The metal detector is located in a lower feeder drum and is composed of three magnetic windings positioned across the width of the feeder drum. To enable better determination of the position of the metal object, a signal processing unit generates differential voltages that correspond to the differences between two of the three individual voltages produced by the windings, and compares the differential voltages with each other and with a threshold value. It also calculates the sum of the winding voltages and generates a confirmation and/or trigger signal when the sum of the voltages is greater than a specified threshold value, by way of which the shut-off device for the feeder drums is actuated, and an alarm and/or display unit is switched on.

The disadvantage of this known harvesting machine is that it is only capable of detecting, using the metal detector, the position of the metal object across the width of the metal detector at the instant the threshold value is exceeded. With metal detection devices having this design, the movement of the metal object until the feeder devices come to a standstill is not taken into consideration.

SUMMARY OF THE INVENTION

The task of the present invention, therefore, is to create a device that enables more exact identification of the foreign object.

Advantageously, the detection signals produced by the windings are detected in a time window, so that the extension of the metal object can be determined across the working width of the pre-compression roller and in the direction of conveyance of the pre-compression roller. In this manner it is ensured that further conveyance of the metallic object brought about by the run-on of the feed devices is detected, and its exact location is detected at the instant when the working elements come to a standstill.

Due to the fact that the time window starts when the detection signal from at least one winding exceeds a threshold value, the time window starts immediately after a metal object is detected.

Advantageously, the time window ends as soon as the working elements have come to a standstill, since the conveyance of the crop material is stopped at this instant.

An economical embodiment of the present invention results when the standstill of the working elements is monitored using speed sensors, since they are provided on the forage harvester anyway to monitor speed.

In an advantageous embodiment of the present invention, a permanent magnet extends through each winding, each one forming a detection region, and the detection signals are induced voltages generated by the presence of the metal object in the detection region of the winding produced by the associated winding.

Due to the fact that the adjacent detection regions overlap and, together, delineate a working width of the metal detection device, a metal object can be detected across the entire width of the working element. In addition, sensor inaccuracies in the boundary zones of the detection regions are diminished or compensated for by the overlap.

To process the detection signals directly, they are advantageously transmitted to a signal processing unit.

Due to the fact that the signal evaluation device compares the detection signals with a threshold value and, if the threshold value is exceeded, triggers the quick stop of at least one working unit, damage to the forage harvester can be prevented. It is also ensured that the frequency of erroneous triggerings of the quick-stop device is reduced or prevented entirely via the definition of a threshold value.

To determine the position and width of the metal object with respect to the working width, the detection signals are recorded as a function of the working width at at least one defined point in time.

To detect the position of the metal object immediately when the metal object is initially detected, the defined point in time is determined by the threshold value being exceeded.

To determine the motion and/or extension of the metal object in the direction of conveyance, the detection signals are advantageously plotted against time.

The signal evaluation device is connected with a display unit and/or a screen so the driver is informed of the position of the metal object and is able to locate the metal object more quickly.

In a first embodiment, the display unit and/or the screen display the detection regions in which a detection signal was generated at a certain instant, thereby narrowing the area to be searched.

In a further embodiment, the display unit and/or the screen display the detection regions in which detection signals were generated during a time window, thereby allowing the extension and position of the metal object to be identified.

In an advantageous embodiment, the display unit includes a plurality of lights, the number and arrangement of which correspond to the number and arrangement of detection regions, so that the driver recognizes the layout of the metal detector by way of the display and, by referring to the illuminated lights, can determine the position of the metal object relative to the metal detector.

If the display unit is located within sight of the working unit, the driver can see both the display and the crop flow being conveyed out of the feeder housing when standing in front of the feeder housing, without having to change location.

Due to the fact that the display unit and/or the screen are automatically reset when the drive of the working unit is switched back on, the driver is relieved of this task.

When the windings are located next to each other, at equidistant intervals transverse to the direction of conveyance of the working element, all of the detection regions have the same level of detection sensitivity.

When the metal detector is located on a self-propelled harvesting machine and the information regarding the discovery and/or type of metal object is stored in a fieldwork computer of the harvesting machine as a function of the position of the harvesting machine when the metal object is discovered, the driver can be warned, when driving on the same part of the field, about locations in the field where metal objects have been repeatedly discovered.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
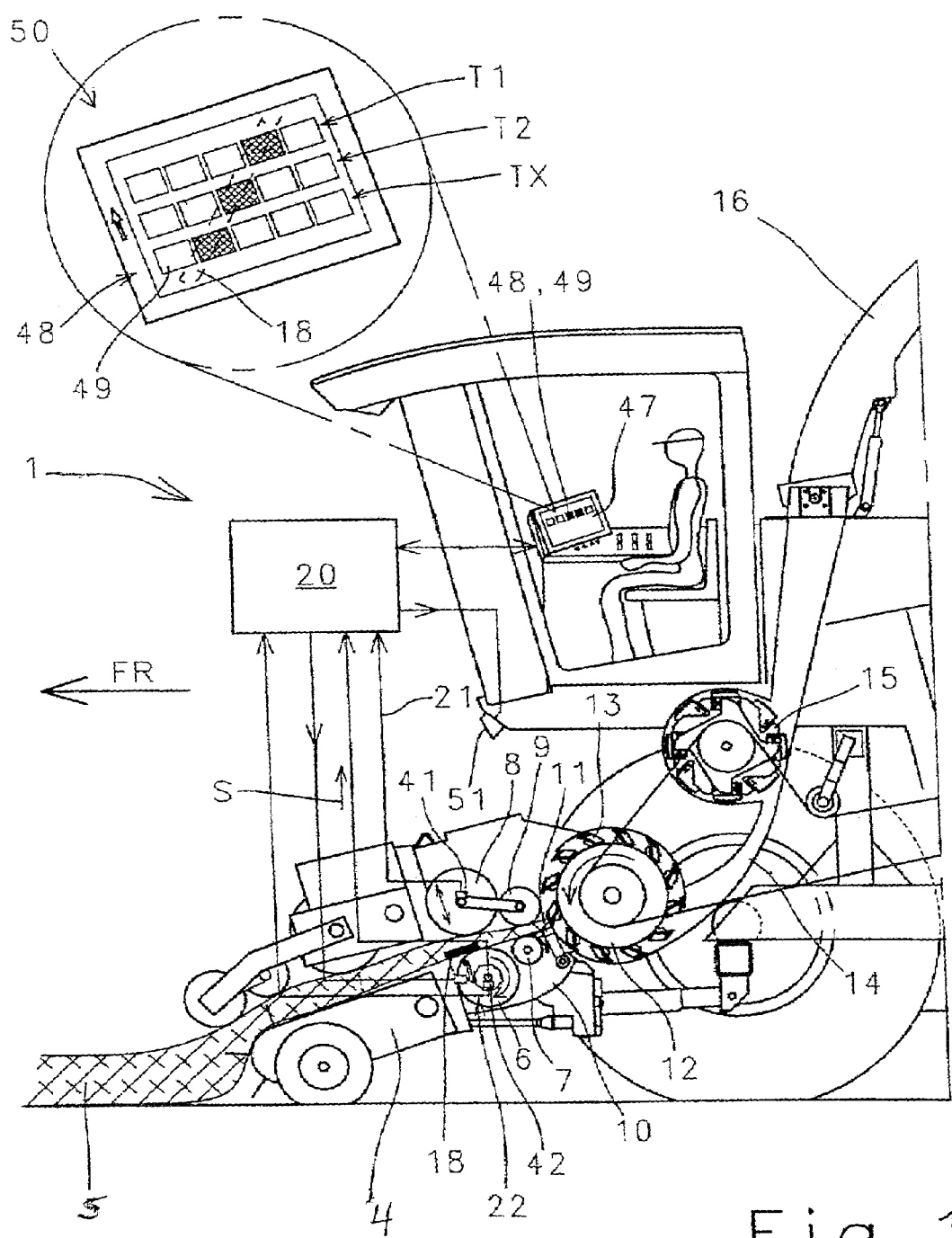
FIG. 1 Shows a schematic side view of a forage harvester with a display unit, in an enlarged depiction, FIG. 2 Shows a longitudinal sectional view through the lower pre-compression roller with a display unit connected thereto, and FIG. 3 Shows a spacial curve that depicts the detection signals as a function of time and a function of the detection regions affected.

FIG. 1 shows a schematic side view of an agricultural harvesting machine configured as a self-propelled forage harvester 1. A front attachment 4 designed as a pick-up is located on the front of forage harvester 1, it being possible to replace front attachment 4 depending on the type of crop to be harvested. The front attachment 4 configured as a pick-up is used to pick up crop material 6 and feed it to the working elements —configured as pre-compression rollers 6, 7, 8, 9 —in feeder housing 10.

Incoming crop material 5 is received and compressed by a first pair of pre-compression rollers 6, 8 and conveyed to a second pair of pre-compression rollers 7, 9 that further compresses pre-compressed crop material 5 into a crop material "log", and conveys the crop material log via a shear bar 11 to a chopper drum 12. At shear bar 11 located directly in front of chopper drum 12, the crop material log is cut up by chopping blades 13 on chopper drum 12. The crop material is conveyed upstream by chopper drum 12 and into lower discharge chute 14. An accelerator 15 is located inside lower discharge chute 14, which further accelerates crop material 5 leaving chopper drum 12 and conveys it via an upper discharge chute 16 out of forage harvester 1, thereby transferring it, e.g., to a hauling vehicle.

A metal detection device 17 is located inside lower pre-compression roller 6 of first pair of pre-compression rollers 6, 8, with which metal objects 18 in the flow of crop material can be sensed. To prevent metal objects 18 from moving further in forage harvester 1 and to eliminate contaminations in crop material 5, metal detection device 17 is connected with a signal evaluation device 20. Signal evaluation device 20 is connected with a quick-stop device 22 known per se, it being possible for quick-stop device 22 to abruptly stop driven pre-compression rollers 6, 7, 8, 9. The quick stop is triggered after a metal object 18 is detected. Signal evaluation device 20 is connected with the central fieldwork computer in the cab of forage harvester 1 and/or is a component of the fieldwork computer, on screen 50 of which the point in metal detector 17 at which a metal object 18 was detected is displayed in a manner to be described in greater detail below.

To ensure that metal object 18 is expelled together with picked-up crop material 5 out of forage harvester 1, the driver initiates a reversing procedure, in which jointly-driven pre-compression rollers 6, 7, 8, 9 and front attachment 4 are driven in the reverse direction.

The operating element for triggering the reversing procedure is installed on the outside of the cabin such that the driver can investigate the crop material flowing out of feeder housing 10 when the reversing procedure is underway. It is also feasible that control device 20 is connected with a display unit 51 on the outside of the cabin, which also displays—in a manner to be described in greater detail below—the location in the metal detector 17 where metal object 18 was detected. Display unit 51 is located such that a driver standing in front of feeder housing 10 can see outflowing crop material 5 and display unit 51 without having to change location, thereby allowing the driver to narrow the searching range and more quickly locate metal object 18 in crop material 5.

Figure 2:
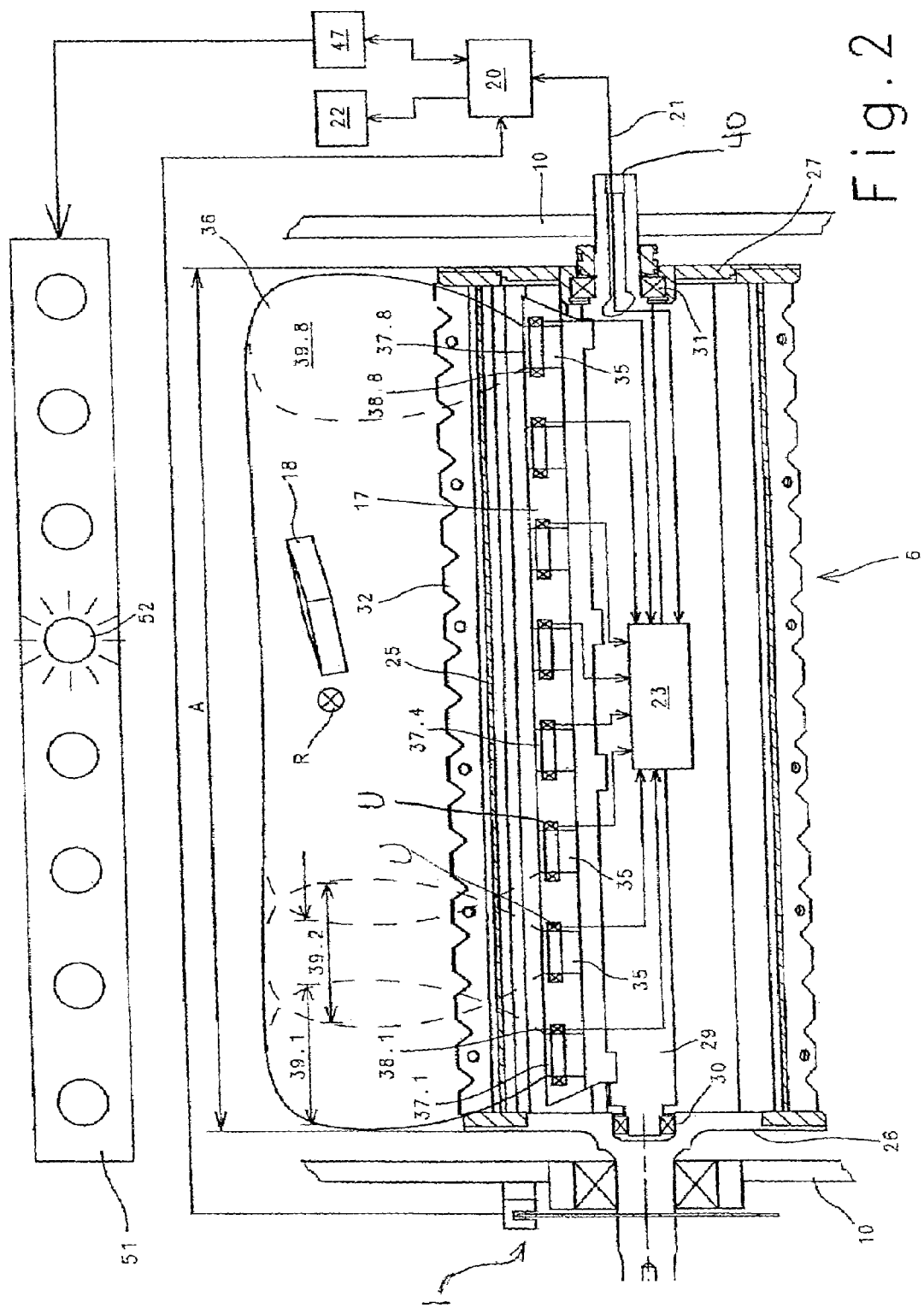

FIG. 2 shows a longitudinal sectional view through lower pre-compression roller 6 of the first pair of rollers. Pre-compression roller 6 is composed of a drum jacket 25 with roller flanges 26, 27 located on the end faces of drum jacket 25. A stub shaft 28 is non-rotatably fastened to roller flange 26 located on the left in FIG. 2, stub shaft 28 being rotatably supported in feeder housing 10. An axle 29 passes through both roller flanges 26, 27, axle 29 being non-rotatably connected on one side with feeder housing 10, and a rolling bearing 30, 31 being located between each roller flange 26, 27 and axle 29, and stub shaft 28 and axle 29 extending coaxially, thereby enabling pre-compression roller 6 to rotate around axle 29. Drum jacket 25 is composed of a plurality of roller profiles 32 that convey the crop material and are located between roller flanges 26, 27. Metal detection device 17 is located on rigid axle 29 inside pre-compression roller 6.

Metal detection device 17 is composed of a plurality of permanent magnets 35 located next to each other in a row and extending across nearly the entire width of pre-compression drum 6. Permanent magnets 35 generate a magnetic field 36 oriented upwardly through drum jacket 25 of pre-compression roller 6 and extending into the flow of crop material. Eight pole pieces 37.1-37.8 are located on permanent magnets 35 at equidistant intervals across the width of pre-compression roller 6 transverse to direction of conveyance R of pre-compression roller 6, each pole piece 37.1-37.8 extending into a winding 38.1-38.8. Windings 38.1-38.8 serve as sensors with which changes in magnetic field 36 can be registered, each winding 38.1-38.8 forming a detection region 39.1-39.8. Adjacent detection regions 39.1-39.8 overlap each other, so that, together, all detection regions 39.1-39.8 extend across working width A of pre-compression roller 6.

If metal object 18 is located in the conveyed crop material, magnetic field 36 changes. As a result, voltages U are induced in windings 38.1-38.8 in whose detection region 39.1-39.8 the change in magnetic field 36 occurs. Induced voltages U are transmitted to a signal module 23 that generates detection signals S as a function of voltages U, detection signals S being transmitted to signal evaluation device 20.

Signal line 21 for transmitting detection signals S generated by signal module 23 are guided outwardly to signal evaluation device 20 through a bore 40 in axle 29.

Figure 3:
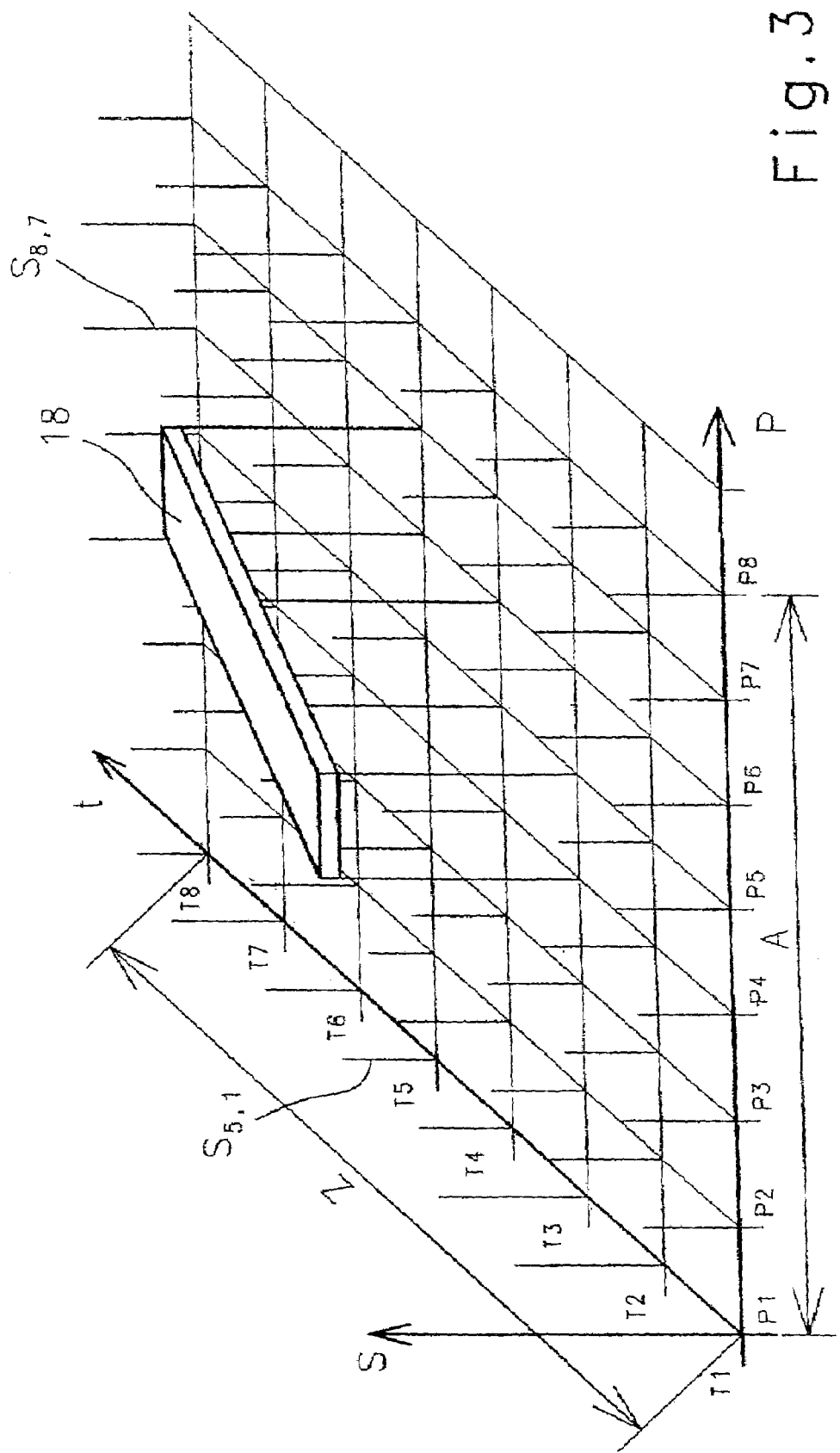

Detection signals S are depicted in FIG. 3. They are detected in a time window Z and plotted against time t in a memory of signal evaluation device 20. Time window Z covers a time frame that starts as soon as a detection signal S exceeds a triggering threshold value stored in signal evaluation device 20, the triggering threshold value causing signal evaluation device 20 to generate a stop signal that is transmitted to quick-stop device 22. Quick-stop device 22 subsequently brings pre-compression rollers 6, 7, 8, 9 and front attachment 4 to an immediate halt. Time window Z ends when pre-compression rollers 6, 7 come to a standstill, the standstill being determined in a manner known per se via speed sensors 41, 42 located on pre-compression rollers 6, 7, the speed signals of speed sensors 41, 42 being transmitted to signal evaluation device 20.

In addition, as shown in FIG. 3, detection signals S are plotted as a function of working width A at a defined point in time T1 that is determined by the triggering threshold value being exceeded, and at further defined points in time TX during time window Z.

Display unit 51 shown in FIG. 2 is composed of a row of a plurality of lights 52 located next to each other at equidistant intervals, the arrangement and number of lights 52 corresponding to the number and arrangement of detection regions 39.1 - 39.8 of metal detection device 17. Display unit 47 displays the detection region 39.1 - 39.8 in which voltages U were generated at a defined point in time T1 - TX by the fact that corresponding lights 52 illuminate.

It is also possible that display unit 47 displays the detection region 39.1-39.8 in which voltages U were generated within time window Z.

The driver sees, on display unit 51, where metal object 18 is located on working width A of pre-compression roller 6.

A plurality of rows 48 of symbols 49 on screen 50 of the fieldwork computer is shown in the enlarged balloon-view in FIG. 1. As with the first embodiment, the arrangement and number of symbols 49 in a row 48 corresponds to the number and arrangement of detection regions 39.1-39.8 of metal detection device 19. Display unit 50 displays the detection region 39.1-39.8 in which detection signals S were generated at certain points in time T1-TX in time window Z, each row 48 depicting a point in time T1-TX; the color of corresponding symbols 49 changes accordingly. The driver sees, on display unit 50, where metal object 18 is located on working width A of pre-compression roller 6. He also sees the extension of metal object 18 in the direction of conveyance of pre-compression roller 6.

A three-axis coordinate system is depicted in FIG. 3, in which detection signals S are depicted as a function of time t and a function of working width A in a spacial curve 46.

The position and extension of metal object 18 can be deduced from detection signals S.

It is feasible that signal evaluation device 20 with detection signals S determines the type of metal object and provides the driver with information via display unit 47, 51 as to whether it is, e.g., a wire, a stake or a tine.

It is also possible that the driver inputs the information that he has found a metal object and what type of metal object it was in the fieldwork computer, and that this information, along with, e.g., the position of forage harvester 1 determined by a navigation system, is recorded when the quick stop is triggered. When the same part of the field is traversed again, a message could then be transmitted to the driver warning him, e.g., that a plurality of certain metallic objects has been sensed in a certain region of the field during previous harvesting operations.

As soon as the driver has switched the drive of pre-compression rollers 6, 7, 8, 9 and/or front attachment 4 back on, screen display 50 and/or display unit 51 are automatically reset. It is also possible, however, that the driver manually initiates the reset after he has looked through sensed crop material 5 and subsequently acknowledges whether a metal object has been found.

An embodiment is also feasible in which the memory of signal evaluation device 20 is designed as a ring memory and detection signals S are stored continually in a ring memory. This means that the oldest detection signals S are deleted when new detection signals S are stored. In contrast to the first exemplary embodiment, with this second embodiment of the present invention, the evaluation is carried out on detection signals S detected in time window Z.

It is within the scope of the ability of one skilled in the art to modify the exemplary embodiments described in a manner not presented, or to use them in other machines to achieve the effects described, without leaving the framework of the invention.

It will be understood that each of the elements described above, or two or more together, may also find a useful application in other types of constructions differing from the types described above.

While the invention has been illustrated and described as embodied in a metal detection device, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

The invention claimed is:

1. A metal detection device for a working unit with at least one working element for conveying crop material, the metal detection device comprising windings for generating detection signals when at least one metal object is present in a region of the working unit, wherein said windings are configured so that the detection signals are detected in a time window, the time window being started when at least one of the detection signals exceeds a threshold value and being ended when the at least one working element comes to a standstill.

2. A metal detection device as defined in claim 1, wherein the threshold value is stored in a signal evaluation device.

3. A metal detection device as defined in claim 1, wherein the threshold value is predetermined.

4. A metal detection device as defined in claim 3; and further comprising rotational-speed sensors monitoring the standstill.

5. A metal detection device as defined in claim 1, wherein the detection signals are electrical.

6. A metal detection device as defined in claim 1, wherein said windings form a plurality of detection regions so that the detection signals are induced voltages generated by a presence of the at least one metal object being then positioned in at least one of the detection regions.

7. A metal detection device as defined in claim 6, wherein said windings are configured so that adjacent detection regions overarp and delineate a working width of the metal detection device.

8. A metal detection device as defined in claim 6; and further comprising a signal evaluation device to which detection signals detected in the time window are transmitted.

9. A metal detection device as defined in claim 8, wherein when the at least one of the detection signals exceeds the threshold value, said signal evaluation device triggers a quick stop of the at least one working element.

10. A metal detection device as defined in claim 8, wherein said signal evaluation device is configured so that the detection signals are recorded as a function of a working width at at least one defined point in time.

11. A metal detection device as defined in claim 10, wherein said signal evaluation device is configured so that the defined point in time is determined by the threshold value being exceeded.

12. A metal detection device as defined in claim 8, further comprising an additional unit being at least one of a display unit and a screen, said signal evaluation device being connected with said additional unit.

13. A metal detection device as defined in claim 12, wherein said display unit has a plurality of lights disposed in an arrangement corresponding to the detection regions.

14. A metal detection device as defined in claim 12, wherein said display unit is located within sight of the working unit.

15. A metal detection device as defined in claim 12, wherein said additional unit is configured so as to display a detection region in which a detection signal was produced at at least one defined point in time within the time window.

16. A metal detection device as defined in claim 12, wherein said additional unit is configured so as to display detection regions in which detection signals were produced within the time window.

17. A metal detection device as defined in claim 12, wherein said additional unit is automatically reset when a drive of the working unit is switched back on after being switched off.

18. A metal detection device as defined in claim 8, wherein the signal evaluation device is configured so that the detection signals are plotted against time.

19. A metal detection device as defined in claim 1, wherein said windings are located next to each other at equidistant intervals transverse to the direction of conveyance of the at least one working element.

20. A method of metal detection for a working unit with at least one working element for conveying crop material, the method comprising the steps of:
   providing windings for generating detection signals when metal objects are present in a region of the working unit; and
   detecting in a time window the detection signals, the time window being started when a detection signal from at least one of said windings exceeds a threshold value and being ended when the at least one working element comes to a standstill.

21. A self-propelled harvesting machine, comprising:
   a working unit with at east one driven working element for conveying crop material; and
   a metal detection device having windings for generating detection signals when metal objects are present in a region of said working unit, wherein said windings are configured so that the detection signals are detected in a time window, the time window being started when at least one of the detection signals exceeds a threshold value and being ended when the at least one working element comes to a standstill.

22. A self-propelled harvesting machine as defined in claim 21; and further comprising a fieldwork computer configured so that an information regarding a detection and/or a type of metal object is stored in said fieldwork computer as a function of a position of the harvesting machine when the metal object is detected.

23. A metal detection device for a working unit with at least one working element for conveying crop material, the metal detection device comprising:
   windings for generating detection signals when metal objects are present in a region of the working unit, wherein said windings are configured so that the detection signals are detected in a time window, the time window being being ended when the at least one working element comes to a standstill; and
   an additional unit being at least one of a display unit, a screen, wherein said additional unit is configured so as to display a detection region in which a detection signal was produced at at least one defined point in time within the time window, whereby an exact position of a metal object relative to said metal detection device is determinable by an operator of said device.

* * * * *